Figure 1:
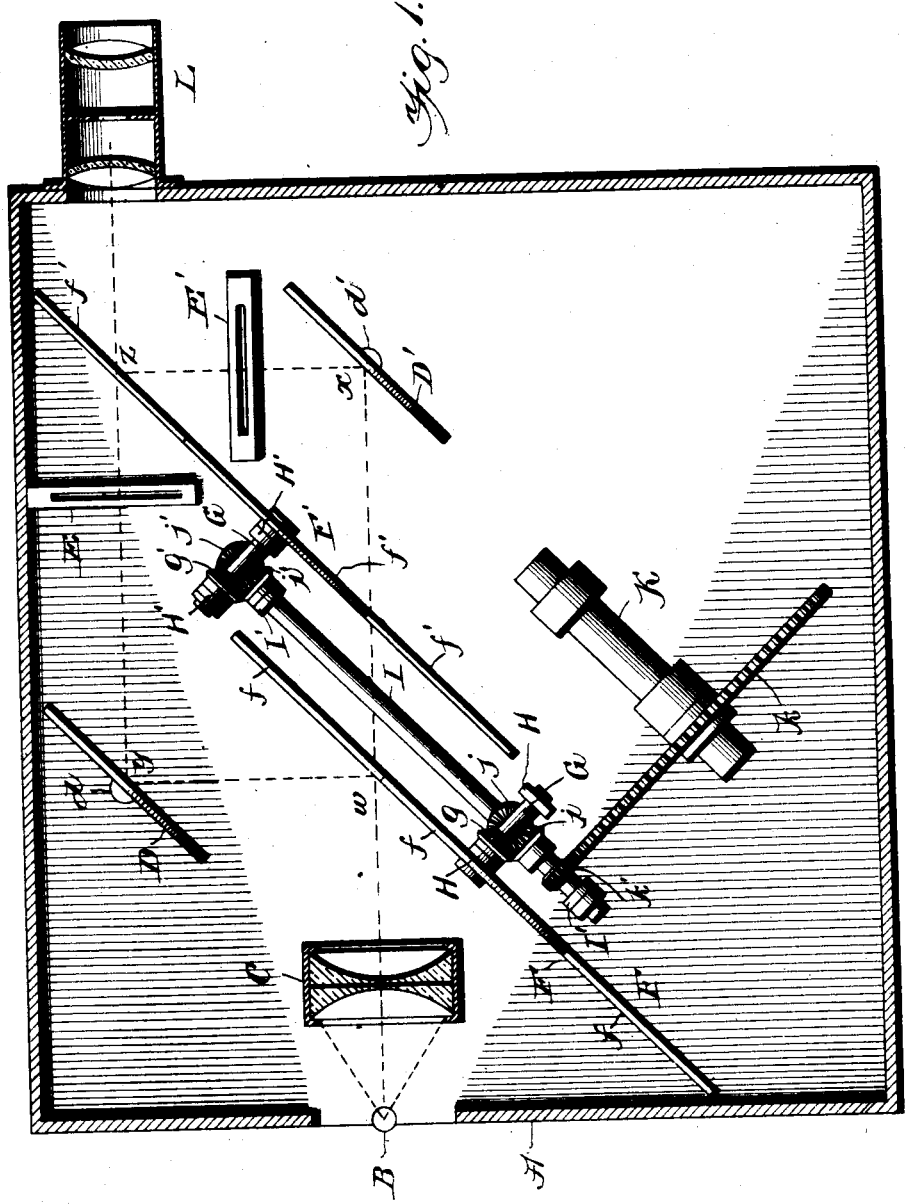

No. 711,440. Patented Oct. 14, 1902.
H. M. REICHENBACH.
PROJECTING APPARATUS.
(Application filed Aug. 2, 1901.)
(No Model.) 2 Sheets—Sheet 1.

Witnesses
Inventor
H. M. Reichenbach
by Wilkinson & Fisher
Attorneys.

No. 711,440. Patented Oct. 14, 1902.
H. M. REICHENBACH.
PROJECTING APPARATUS.
(Application filed Aug. 2, 1901.)
(No Model.) 2 Sheets—Sheet 2.
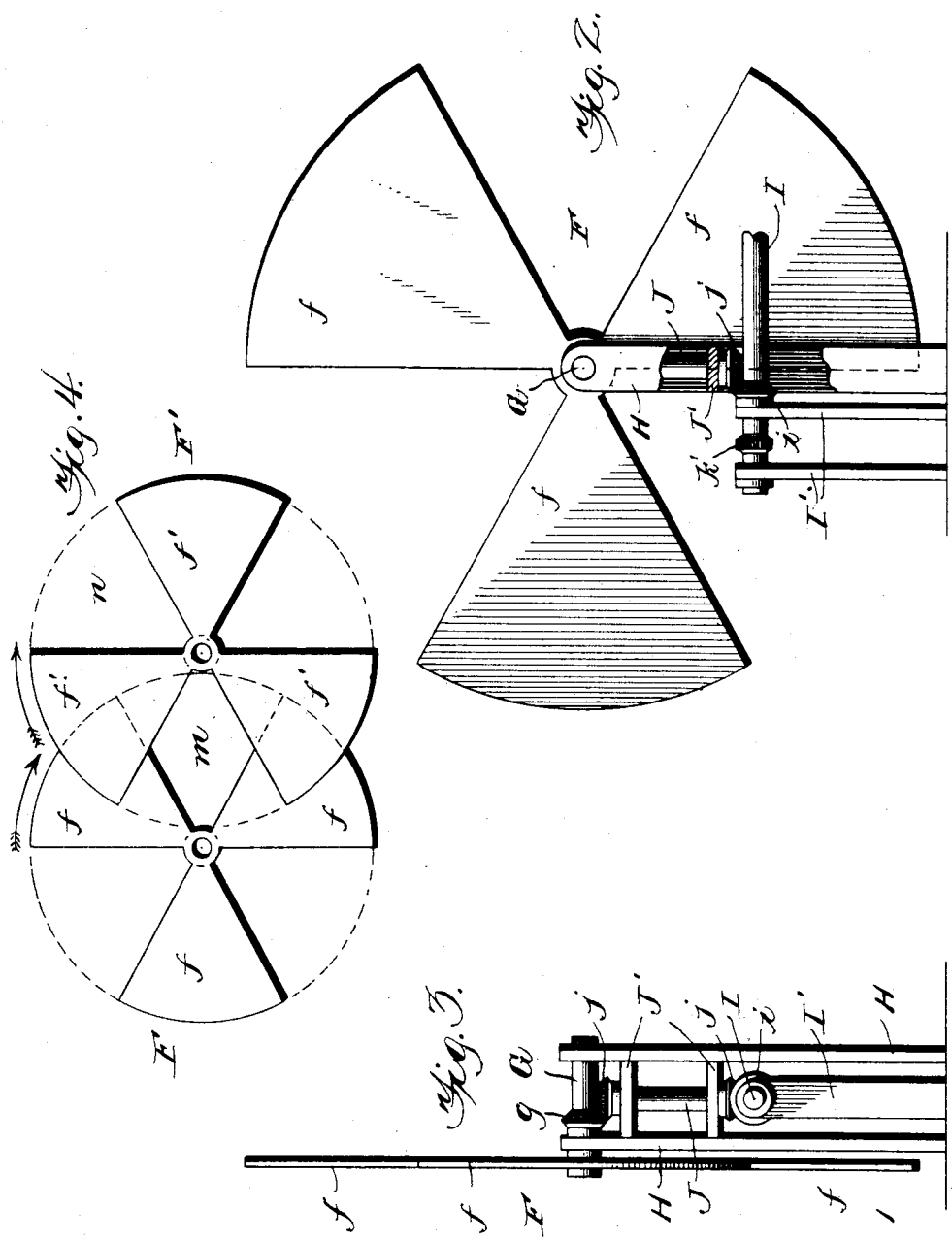

UNITED STATES PATENT OFFICE.

HENRY M. REICHENBACH, OF DOBBS FERRY, NEW YORK.

PROJECTING APPARATUS.

SPECIFICATION forming part of Letters Patent No. 711,440, dated October 14, 1902.

Application filed August 2, 1901. Serial No. 70,669. (No model.)

*To all whom it may concern:*

Be it known that I, HENRY M. REICHENBACH, a citizen of the United States, residing at Dobbs Ferry, in the county of Westchester and State of New York, have invented certain new and useful Improvements in Projecting Apparatus; and I do hereby declare the following to be a full, clear, and exact description of the invention, such as will enable others skilled in the art to which it appertains to make and use the same.

My invention relates to improvements in apparatus for projecting animated pictures on a screen; and its principal object is to provide a simple means for continuously and uniformly illuminating the screen on which the picture is being projected, doing away with the shutter usually employed, and thus avoiding the dark period during the film change.

Another feature of my device is to provide a means whereby through the medium of tinted glasses or a second film a softened light may be projected on the object-screen during the film change from the same source of light projected through the picture-containing film for various purposes—such, for instance, as to diminish the intensity of the light during the film change to equal the intensity of the light coming through the projected subject, thereby creating a uniform illumination of the screen.

To more fully describe my invention, reference is had to the accompanying drawings, illustrating the device, in which—

Figure 1 is a horizontal section through the casing, the operating mechanism being shown in plan. Fig. 2 is a front elevation of one of the revolving reflector-disks, a part of its support being broken away. Fig. 3 is a side view of the same, showing the means of connecting the reflector-blades with the propelling-shaft; and Fig. 4 is a diagrammatic view showing the reflector-blades in their open and closed position by full and dotted lines, respectively.

A represents a box or casing, B the source of light, and C a suitable condenser.

D and D' are mirrors disposed parallel to each other in the path of light from the condenser and supported by upright supports $d\, d'$.

E is a film-trap of suitable construction, through which the film containing the photographic impression is advanced, and E' is a screen-holder of suitable construction, or it may be constructed in a manner similar to the film-trap E for regulating the passage of a second film.

F is a disk of polished silver or other material of high reflecting properties cut away to form a plurality of blades $f$ of uneven number revolubly mounted on the shaft G, carrying the bevel-gear $g$ and supported in the upright supports H. F' is a disk similar in construction and material to the disk F, mounted on the shaft G', carrying the bevel-gear $g'$ and supported in the uprights H'. These two disks F and F' are rotated in parallel planes by the shaft I, journaled in the upright supports I', through the medium of the upright shafts J, journaled in the horizontal supports J', carrying the oppositely-disposed bevel-gears $j\, j'$, meshing with the bevel-gears $g$ and $g'$ on the horizontal shafts G and G' and the bevel-gears $i$ on the shaft I. The disks revolve in the same direction as indicated by the arrows in Fig. 4, and although I have shown them provided with only three blades it is obvious that they may carry any number of blades in which a blank or open space is diametrically opposite a closed one. Any suitable driving mechanism may be employed—such, for instance, as the shaft K, carrying the gear-wheel $k$, meshing with the gear $k'$, fast on the shaft I, the driving mechanism K to be operatively connected also with any suitable mechanism (not shown) for advancing the film, the connections being so adjusted as to operate the film and the reflector-disks at the proper rate of speed in respect to each other.

L is the lens, through which the image is projected on the screen.

Having specifically described the component parts of my invention, the operation of the device is as follows: When the blades $f\, f'$ are in the position shown in full lines in Fig. 4, the path of the light is along the dotted line $w\, x\, z$, Fig. 1, through the opening $m$ to the mirror D', thence through the screen E' to the reflector-blade $f'$ opposite the opening $m$ to the lens L. When the blades $f\, f'$ are in the position shown in dotted lines, Fig. 4, the path of the light is obstructed and reflected by one of the reflector-blades $f$ to the mirror D, thence through the projected subject in the film-trap E, through the cut-away portion $n$ of the disk F', through the lens L, or along the dotted line $w\ y\ z$, Fig. 1.

The support E' may be so constructed as to be used either as a screen for holding tinted glass or a film-trap for regulating the passage of another film for the purpose of showing or joining two scenes. For instance, there may be two films, one showing a garden and the other some noted person. By my device, the one being projected at one interval or position of the blades and the other at the next position of the blades, the two pictures would for all purposes be blended as one.

It is obvious that many modifications might be made in the details of construction of my improved device without departing from the spirit of my invention; but,

Having thus described my invention, what I claim, and desire to secure by Letters Patent of the United States, is—

1. In a projecting device, the combination with a film-trap, a lens and a source of light, of means to project said light around said film-trap and through said lens, and means, between said source of light and said film-trap, to deflect the light through the film-trap and lens at intervals alternating with the projection of the light around the film-trap.

2. In a projecting device, the combination with the film-trap, lens and source of light, of a movable reflector and means for operating the same, and a plurality of stationary reflectors coöperating with said movable reflector to alternately project said light through said film-trap and lens and around said film-trap and through said lens to the screen, for continuously illuminating the screen.

3. In a projecting device, the combination with the film-trap, lens and source of light, of a plurality of movable reflectors and means for operating the same, and a plurality of stationary reflectors coöperating with said movable reflectors to alternately project said light through said film-trap and lens and around said film-trap and through said lens to the screen for continuously illuminating the screen.

4. In a projecting device, the combination with the film-trap, lens and a single source of light, of a revoluble reflector located in the path of said light and means for revolving the same, and mirrors coöperating with said reflector to alternately project the light through said film-trap and lens and around said film-trap and through said lens.

5. In a projecting device, the combination with the film-trap, lens and a single source of light, of a pair of revolving reflectors mounted in the path of said light, and mirrors coöperating with said reflectors to project said light through said film-trap and lens and around said film-trap and through said lens.

6. In a projecting device, the combination with the film-trap, lens and a single source of light, of a revolving disk, provided with reflector-blades, mounted in the path of said light, and mirrors coöperating with said reflector-disk to alternately project the said light through the said film-trap and lens and around the film-trap and through said lens.

7. In a projecting device, the combination with the film-trap, lens and source of light, of a pair of revolving reflector-disks, each provided with a blade and a diametrically opposed cut-away portion, mounted in the path of said light, and means coöperating with said revolving disks to alternately project the light through the film-trap and lens and around the film-trap and through the lens.

8. In a projecting device, the combination with the film-trap, lens and a single source of light, of mirrors located to the front and rear of said film-trap, and means for projecting said light alternately on said mirrors and through said film-trap and lens and around said film-trap and through said lens.

9. In a projecting device, the combination with the film-trap, lens and source of light, of a pair of revolving parallel reflecting-disks having a plurality of blades and oppositely-disposed cut-away portions, and mirrors located in proximity to said reflecting-disks so as to alternately project the light through the film-trap and around the same to the screen.

10. In a projecting device, the combination with the film-trap, lens and source of light, of a pair of revolving parallel reflecting-disks, having a plurality of blades and oppositely-disposed cut-away portions, and mirrors in proximity to and located in planes parallel to said disks, so as to alternately project the light through the film-trap and around the same to the screen.

11. In a projecting device, the combination with the film-trap, lens and source of light, of a pair of mirrors located to the front and to the rear of said film-trap, a revolving reflector having cut-away portions between its reflector-blades, so located as to project the light to one of said mirrors, thence through the film-trap to the screen, and a second similar revolving reflector in proximity to the first reflector the cut-away portions in one adapted to aline with the cut-away portions in the other to project the light to said other mirror, thence to said second reflector in front of the film-trap to the screen.

12. In a projecting device, the combination with the film-trap, lens and source of light, of a reflector-disk, having a cut-away portion revolubly mounted in the path of said light, a similar revolving reflector-disk mounted in front of said film-trap, and suitable mirrors located in proximity to and coöperating with said reflector-disks to alternately project the light through said film-trap and around the same to the screen.

In testimony whereof I affix my signature in presence of two witnesses.

HENRY M. REICHENBACH.

Witnesses:
WILLIAM STUART,
JAMES J. GILLESPIE.